E. AHRENS.
APPARATUS FOR MANUFACTURING ARTIFICIAL STONE SLABS.
APPLICATION FILED JULY 8, 1911.
1,053,342.
Patented Feb. 18, 1913.
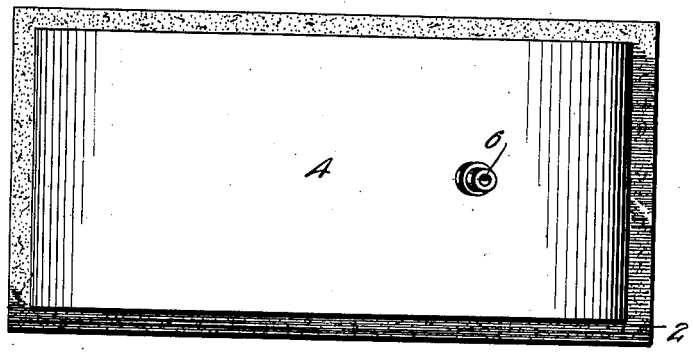
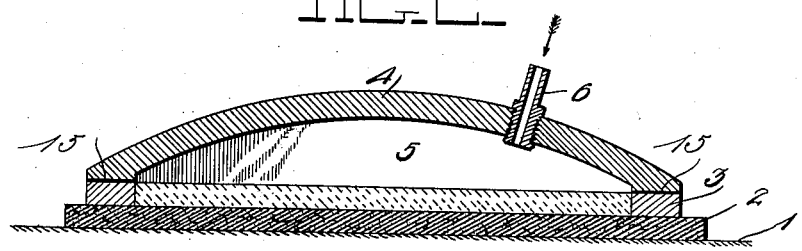
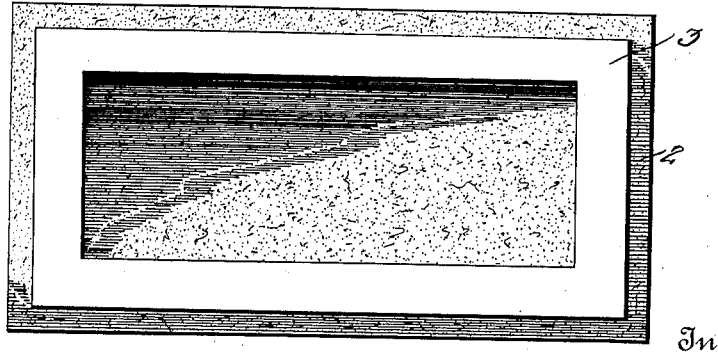
Witnesses
O. R. Pierce
O. B. Hopkins
Inventor
Emil Ahrens.
by H. B. Willson & Co.
Attorneys

UNITED STATES PATENT OFFICE.

EMIL AHRENS, OF HALLE-ON-THE-SAALE, GERMANY, ASSIGNOR TO SUPERIOR ASBESTOS COMPANY, OF NEW YORK, N. Y., A CORPORATION OF NEW YORK.

APPARATUS FOR MANUFACTURING ARTIFICIAL-STONE SLABS.

1,053,342.   Specification of Letters Patent.   Patented Feb. 18, 1913.

Application filed July 8, 1911. Serial No. 637,420.

*To all whom it may concern:*

Be it known that I, EMIL AHRENS, a subject of the Emperor of Germany, residing at Halle-on-the-Saale, in the Kingdom of Prussia, Germany, have invented certain new and useful Improvements in Apparatus for Manufacturing Artificial-Stone Slabs; and I do declare the following to be a full, clear, and exact description of the invention, such as will enable others skilled in the art to which it appertains to make and use the same.

This invention relates to an improved process and apparatus for manufacturing artificial stone, and more particularly of a design in the form of slabs, and preferably composed of a mixture of fibrous materials and hydraulic binding cements or other suitable materials in a plastic condition.

Heretofore in the manufacture of slabs of the character described, it has been necessary to employ a mixture which is stiff and which contains a small percentage of water or moisture, and therefore, considerable difficulty and waste of time have been experienced in uniformly distributing the mixture within shaping molds previous to completing the slab.

The object of this invention therefore, consists in the provision of a simple, practical and efficient apparatus, whereby plastic material in a soft condition and capable of being readily and conveniently placed in the forming mold may be employed whereby the water or moisture can be advantageously and uniformly forced from the material or mixture thus formed by the application of compressed air or inert gas.

Briefly stated, the invention consists in the employment of a sheet of porous and flexible material as a bottom, the pores of which are of such a nature as to permit only the water to pass therethrough, a mold of suitable design in the form of a frame adapted to be removably placed upon said material to form the bottom of the said mold, a dome shaped hood or cover forming a compressed receiving chamber, the shape and size of which hood conforms substantially to the shape and size of the forming mold, and is adapted to be hermetically sealed temporarily to said frame, and means for supplying compressed air to the chamber above the plastic material.
With these and other objects in view, the invention consists of certain novel features of construction, combination and arrangement of parts as will be more fully described and claimed.

In the accompanying drawings: Figure 1 is a top plan view of the complete invention. Fig. 2 is a central vertical section of the same. Fig. 3 is a top plan view of the mold forming frame and the porous material forming the bottom thereof.

In the embodiment of the invention, 1 represents a flat platform or base upon which the apparatus is removably located.

In properly arranging the various parts comprising the invention a sheet of fabric 2, or other suitable woven fabric is employed, of a thickness to properly absorb and release the water and moisture from the formation to be subsequently completed after treatment into a slab capable of the various purposes for which the same is intended.

The fabric sheet 2, forms the bottom for the mold 3, the latter being in the form of a frame of any suitable and desired design, said frame being removably disposed upon the said fabric before the plastic material is deposited within the same.

Removably secured to the upper surface of the slab forming frame or mold 3, is a cover or hood, in the form of a convex dome 4, forming a compressed air chamber 5, above the plastic material to be operated upon for removing the water and moisture therefrom.

The uniting lower edge of the dome 4 is formed to properly rest upon the upper surface of the frame 3, and conform thereto and the parts referred to hermetically and temporarily sealed by pressing it down to the frame 3, in any suitable manner, glue or other adhesive substance being employed if necessary.

In order to supply compressed air to the chamber 5, the hood or dome 4 is provided with a nipple 6, in its top to the outer projecting end of which a hose or other conductor may be attached communicating with a suitable source of supply of any well known construction.

As clearly shown the hood 4 is designed in such a shape that the inner concaved surface thereof terminates adjacent to the surface of the cement or other plastic material confined in the mold 2, whereby, the compressed air or inert gas is evenly distributed and directed to the detachably secured edges of the hood of the mold and in direct contact with the plastic material thus confined.

From the foregoing description it will be readily seen that when compressed air is supplied to the chamber 5 under a high pressure, all water and moisture will be forced from the previously arranged plastic material and through the porous fabric 2, forming the bottom of the mold and upon which said forming mold is in contact.

After the plastic material has been properly treated in the manner described the cover or dome 4, is removed from the frame, and the frame 3 from the bottom 2, in any suitable manner for the reassembling of the apparatus and the manufacture of another slab.

From the foregoing description taken in connection with the accompanying drawings, the construction and operation of the invention will be readily understood without requiring a more extended explanation.

Having thus described my invention, what I claim as new is:—

In an apparatus of the class described, the combination with a flat imperforated base impervious to moisture, of a mold comprising a sheet of finely woven fabric resting upon said base, a solid frame forming the edges of the mold and removably positioned upon said fabric, the latter forming a continuous absorbent base for the mold with exposed water discharging edges, a cover detachably secured to the upper surface of the frame and hermetically sealed thereto forming a compressed air chamber, the secured edges of the cover terminating substantially on a line with the plastic material confined within the frame of the mold, and means for supplying compressed air to said chamber above the slab of plastic material and in direct contact with the latter, whereby the water and moisture are simultaneously forced through said plastic material and fabric.

In testimony whereof I have hereunto set my hand in presence of two subscribing witnesses.

EMIL AHRENS.

Witnesses:
ALBERT R. MORAWETZ,
RUDOLPH FRICKE.